United States Patent [19]

Delcambre

[11] Patent Number: 4,846,692
[45] Date of Patent: Jul. 11, 1989

[54] EDUCATIONAL CHILDREN'S TOY

[76] Inventor: Thomas L. Delcambre, P.O. Box 851, New Iberia, La. 70561-0851

[21] Appl. No.: 198,651

[22] Filed: May 23, 1988

Related U.S. Application Data

[63] Continuation-in-part of Ser. No. 118,045, Nov. 9, 1987, abandoned.

[51] Int. Cl.⁴ .............................................. G09B 1/06
[52] U.S. Cl. .................................... 434/159; 434/172; 434/184; 434/193; 434/200; 434/259
[58] Field of Search ............... 434/159, 171, 184, 193, 434/200, 259, 172

[56] References Cited

U.S. PATENT DOCUMENTS

| | | | |
|---|---|---|---|
| 264,066 | 9/1882 | Crandall | 434/159 |
| 2,415,342 | 2/1947 | Donner | 434/171 |
| 2,839,842 | 6/1958 | Keyko | 434/259 |
| 2,861,358 | 11/1958 | Ward | 434/184 |
| 3,346,968 | 10/1967 | Dellinger | 434/159 X |
| 4,188,734 | 2/1980 | Rich | 434/159 |
| 4,427,390 | 1/1984 | Manger | 434/159 |
| 4,509,920 | 4/1985 | Kaufmann | 434/159 |

*Primary Examiner*—William H. Grieb
*Attorney, Agent, or Firm*—Guy E. Matthews

[57] ABSTRACT

A toy adapted to instruct young children by association. The toy teaches proper numeric, alphabetic, or color sequences and the standard left to right reading convention, by utilizing blocks that are inserted into shafts in a stand. Blocks inserted out of proper sequence will fall through the stand but passage of blocks inserted in the proper sequence will be obstructed and those blocks will not fall through but will remain supported within the stand.

20 Claims, 7 Drawing Sheets

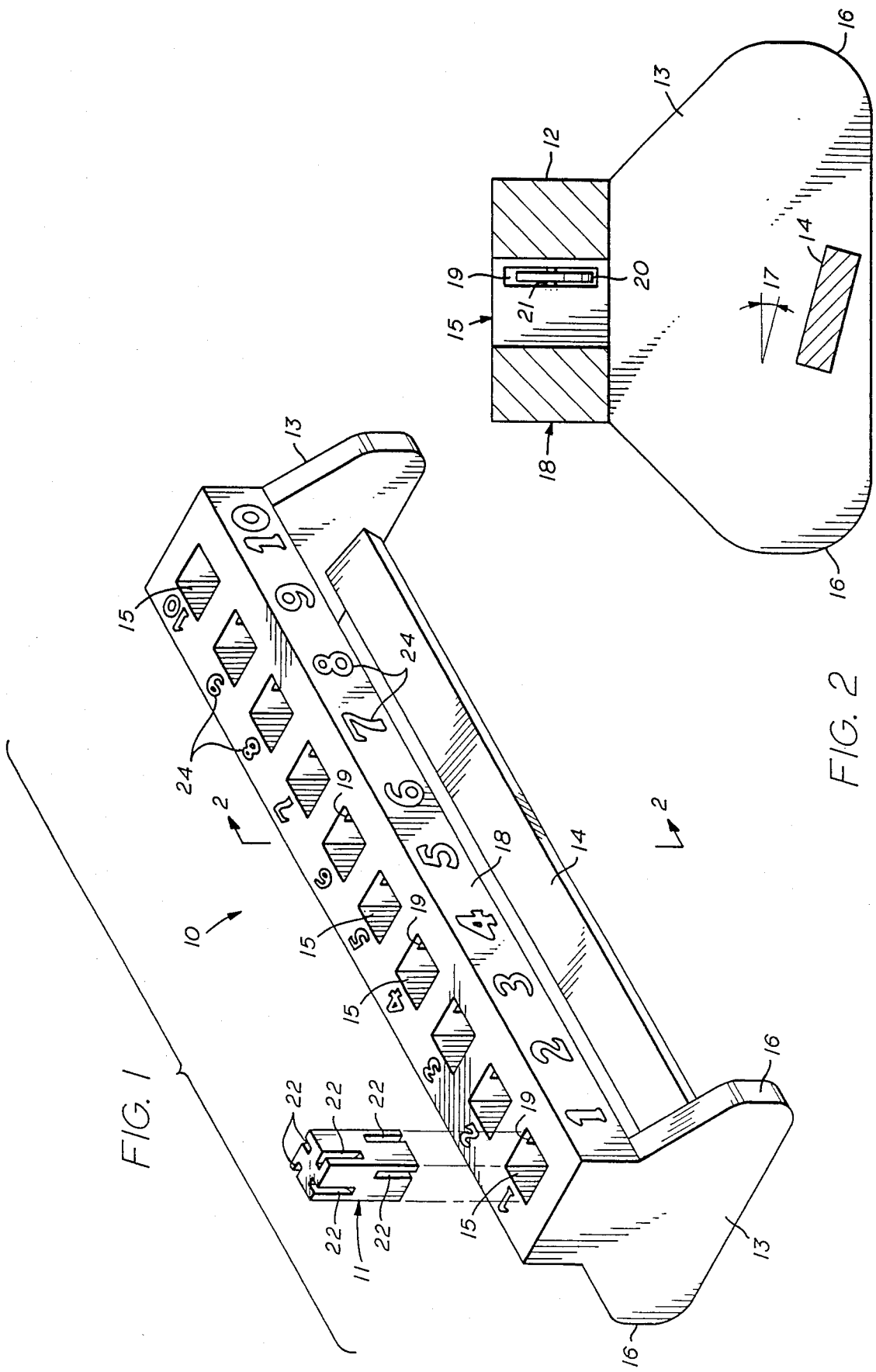

EDUCATIONAL CHILDREN'S TOY

This application is a continuation-in-part of application Ser. No. 07/118,045 filed Nov. 9, 1987, now abandoned.

FIELD OF THE INVENTION

This invention relates generally to toys, and more particularly to an educational toy adapted for use by young children ranging in age from toddlers to preschoolers.

In today's technological world, as never before, literacy is essential. The world of the future will make even more demands and, as the inhabitants of that future world, today's children need to be given every possible advantage. There are many toys designed to combine education and play, covering various skills and concepts. This invention provides an amusing toy for teaching young children numerical and alphabetical symbols and sequences, unique among other toys, in that it cannot be made to operate out of sequence. In a similar manner, this toy can be used to teach the order of the colors of the spectrum. Learning the proper numeric order of numbers is the foundation of the field of mathematics, and learning the alphabet is the first step toward learning to read. A child using this toy learns the normal left to right convention that is used for writing and reading in the English language. Children getting an early start with words and numbers will be better prepared to tackle their future.

DESCRIPTION OF THE PRIOR ART

There are other toys designed to teach children alphanumerical sequences, but all of them may be operated out of sequence, as distinguished from the invention disclosed here. The Kaufman toy, U.S. Pat. No. 4,509,920 utilizes a support rod and a number of body members labeled with numbers. A guide pin on each body member in conjunction with a channel on the support rod operates so that only when the body members are installed in a predetermined sequence will the numbers all be in a line. However, it is possible to assemble the toy out of sequence, unlike the invention of this disclosure which can only be operated in one proper sequence. In addition, the guide pin and body member configuration is very different from the stand, shaft, and block configuration of this invention.

The Keyko toy, U.S. Pat. No. 2,839,842 and the Crandall toy, U.S. Pat. No. 264,066 are both similar in configuration to the Kaufman toy. They use a series of body parts or sections that are stacked one on top of the other, with each part being labeled with a number. Again, the configurations of these telescoping tower toys are totally different from the toy of this invention. Assembly of the Keyko and Crandall toys may be started with any of the sections, and may proceed out of sequence.

The Donner toy, U.S. Pat. No. 2,415,342 is adapted so that numbered bricks are arranged in a row upon a base plate, the bricks and plate having ribs and grooves respectively on their mating surfaces. The final arrangement of bricks must be in numerical order, but the numbered bricks may be placed in position in any sequence. The blocks of the toy of this invention, as distinguished from the Donner toy, cannot be inserted out of sequence. Only by inserting the blocks in sequence from 1–10 will all of the blocks be supported within the top member of the stand.

The educational Manger toy, U.S. Pat. No. 4,427,390 is very different from the toy of this invention. The Manger toy is configured as a book, with letters or numbers that attach, by means of Velcro connection, to a page that has a printed representation of the corresponding symbol. The letters may be attached in any sequence, and do not even have to be attached in any certain location, unlike the toy of this invention.

SUMMARY OF THE INVENTION

In accordance with the invention, this toy comprises a three dimensional object provided with a top surface which is provided with an arrangement of openings through the top surface, and the toy further includes a plurality relatively smaller objects sized to pass through the openings. The three dimensional object is depicted in the accompanying drawings as a stand, but it could take a variety of shapes, for example it could be fashioned in the shape of a truck, a boat, a plane, or a train. The stand depicted comprises a horizontal top member, two vertical end support members, and an angled longitudinal support and deflecting member. Numbers or alphabetical characters label each shaft in sequence, and means is provided that prevents any block inserted in a predetermined sequence from dropping through the shaft, but which allows any block inserted into a shaft out of that proper sequence to drop through the stand, strike the angled longitudinal member, and be deflected toward the front of the toy and therefore toward the child using it. One embodiment described utilizes eccentrically mounted free swinging circular cams located in slots intermediate to adjacent shafts, and notches cut in the blocks, as the means for selectively obstructing the shafts only in proper numerical sequence. An alternate embodiment uses specially shaped eccentrically pivoted pendulums as the selective apparatus.

BRIEF DESCRIPTION OF THE DRAWINGS

In order that it may be readily carried into effect, the toy of this invention will now be described with reference to the following drawings:

FIG. 1 is a perspective of an embodiment of the toy illustrating one of the plurality of blocks and the stand;

FIG. 2 is a cross-sectional view through one embodiment of the stand;

FIG. 17 is a perspective view of an alternative embodiment utilizing a box shaped stand, and two rows of openings shaped as the 1 through 10, and corresponding blocks shaped to fit into the openings;

FIG. 18 is a perspective view of an alternative embodiment wherein the stand is shaped as a block provided with openings formed into the shape of letters of the alphabet which spell words, wherein the blocks are shaped so as to fit into the openings provided;

FIG. 19 illustrates an alternative embodiment wherein the stand is configured so as to provide two rows or openings shaped as letters of the alphabet, and wherein the blocks are configured to correspond to the openings so as to spell someone's name.

DETAILED DESCRIPTION OF THE PREFERRED EMBODIMENTS

Figure 3:
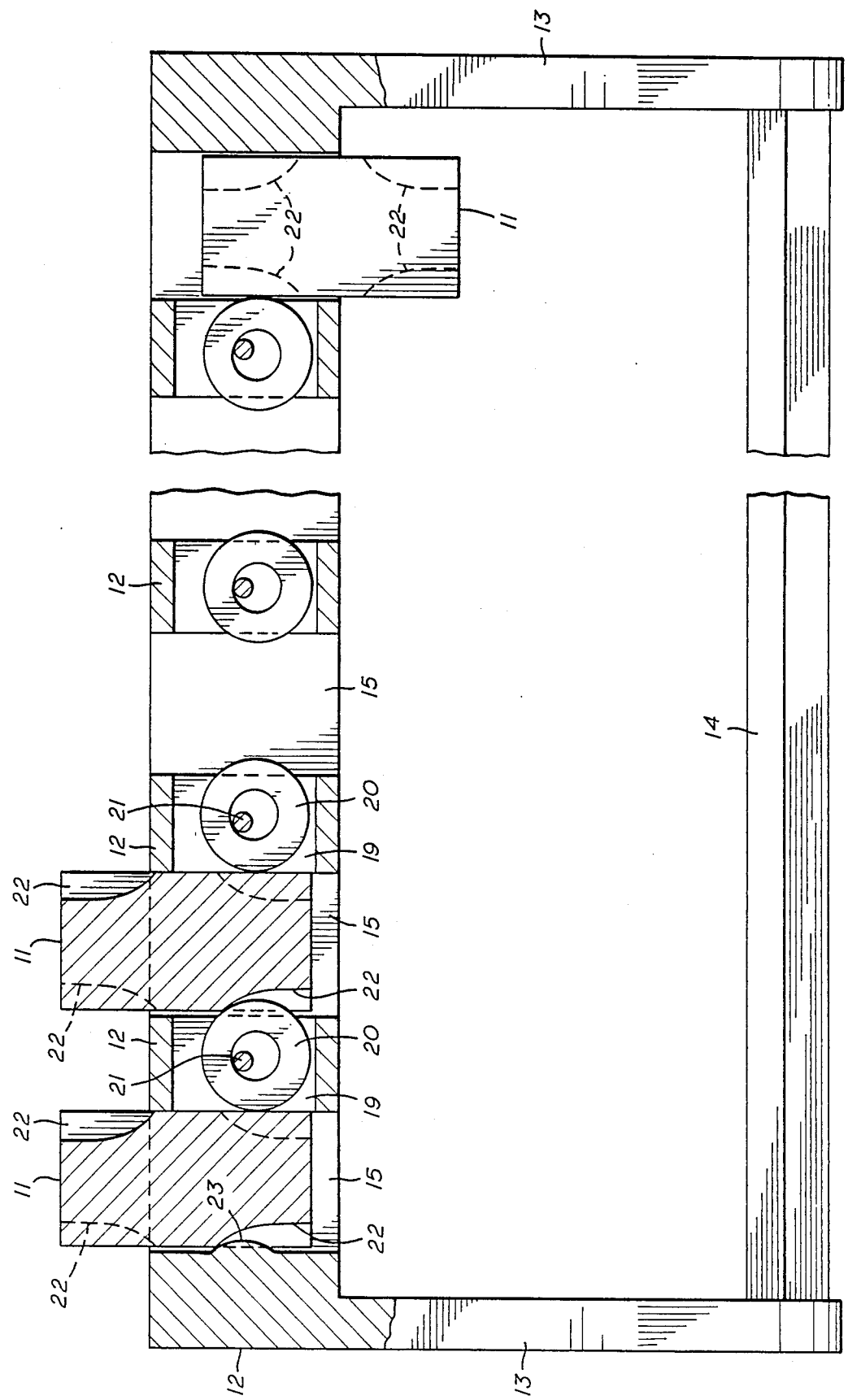
FIG. 3 is a longitudinal section through one embodiment of the stand, illustrating the action of the free swinging cam selective obstructing means.

Any suitable configuration comprised of: a three dimensional object provided with openings through the upper surface; a plurality of smaller objects or blocks sized to pass through those openings or shafts; and means for selectively obstructing the shafts, may be used. Although one embodiment illustrated depicts the three dimensional object in the form of a stand 10, other forms are possible. For example it may be desirable to form the toy of this invention into the shape of a truck, boat, car, or plane, to mention a few of numerous possibilities. One of the many suitable configurations, comprising a stand 10 and a plurality of blocks 11, the top surface 12 of the stand provided with open shafts 15 and the blocks 11 of suitable size and shape to pass through the shafts, is illustrated (FIG. 1). A primary consideration in choosing the sizes of the stand and blocks is the expected use of this toy for teaching small children, therefore, the toy should be of a size large enough for a child to manipulate but small and light enough for a child to pick up and move around. A single configuration is illustrated in the drawings and described as the invention, but the invention is not to be understood as limited to the configuration as illustrated (FIGS. 1–5). Although, because of common toy producing techniques, it is anticipated that the most efficient production will utilize molded plastic, the components of the toy may consist of any suitable material such as, for example, metal, wood, plastic, rubber, or the like. Furthermore, any suitable color scheme may be utilized to enhance the attractiveness of the toy of this invention to children. In particular, utilizing bright primary colors, for example, red, yellow, and blue, may help sustain the child's attention and affirm its impression of the invention as a toy.

Figure 12:
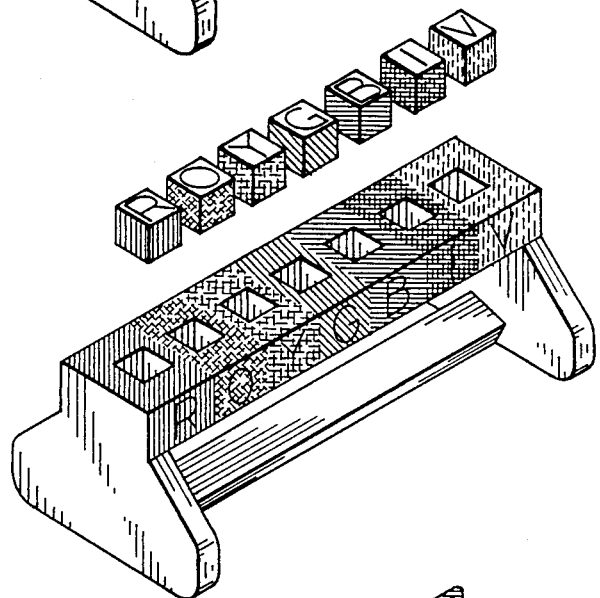
FIG. 12 is a perspective view of an alternative embodiment utilizing a stand colored with different shadings of the specttrum and blocks colored with shades of the spectrum corresponding to shades located on the stand.

The stand 10 may be all of one color, or may be multicolored, or may follow a specific color pattern. An alternating color pattern may be used, or shading of the color spectrum may be used, from red at one end of the stand to blue or violet at the opposite end. The blocks 11 also may be all of one color, multicolored, or may each be a different color or may have each face of a different color. Each block 11 may also be colored with shadings of the spectrum, or each block may be colored with a different color of the spectrum. FIG. 12. utilizing a stand colored with shadings of the spectrum and blocks with each block colored with the shade of the spectrum corresponding to the shade located on the stand at the location of one of the open shafts may help to arouse and sustain a child's interest in the toy and further help develop an appreciation of color, patterns, and the properties and order of the color spectrum.

Figure 6:
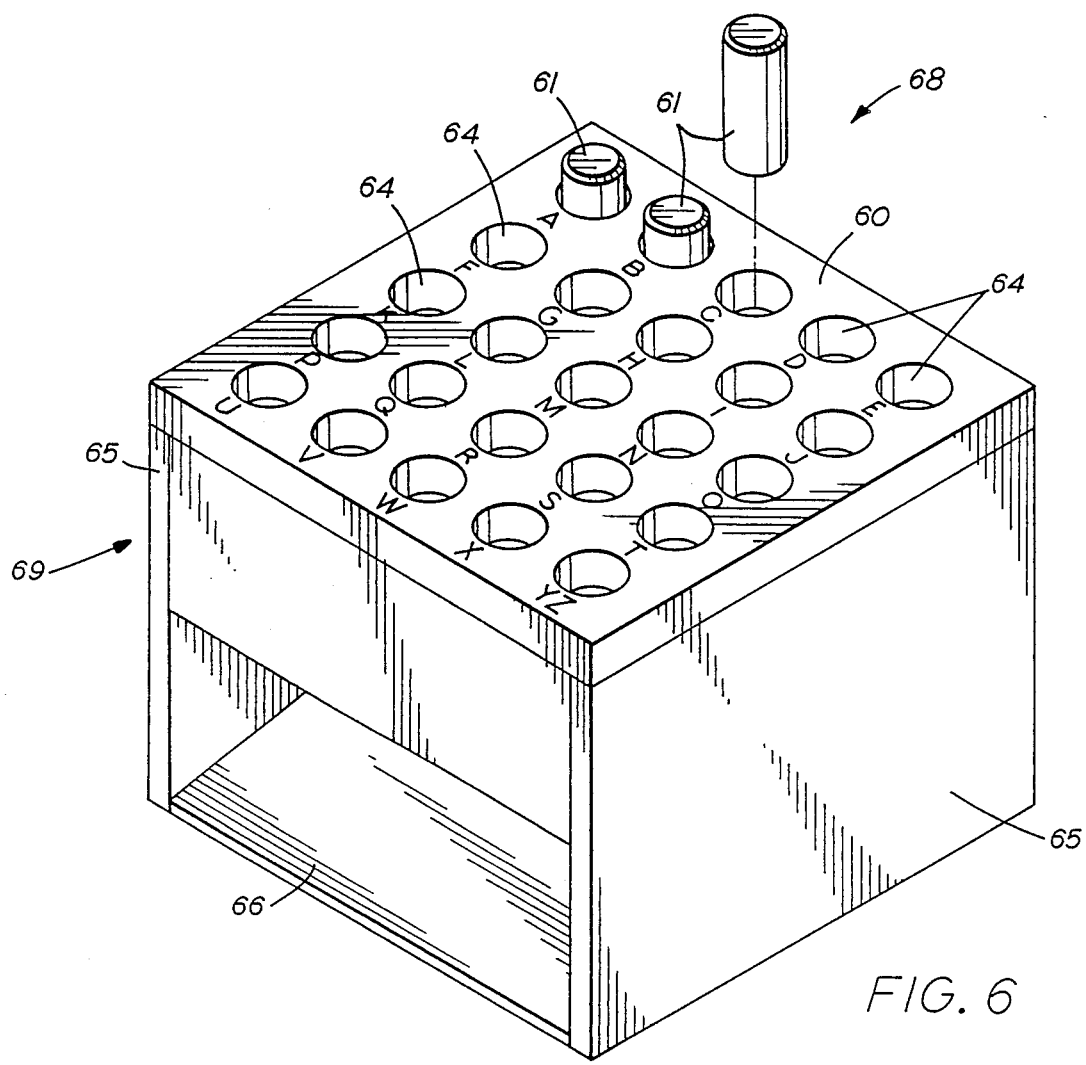
FIG. 6 is a perspective view of an alternative embodiment of the toy.
Figure 7:
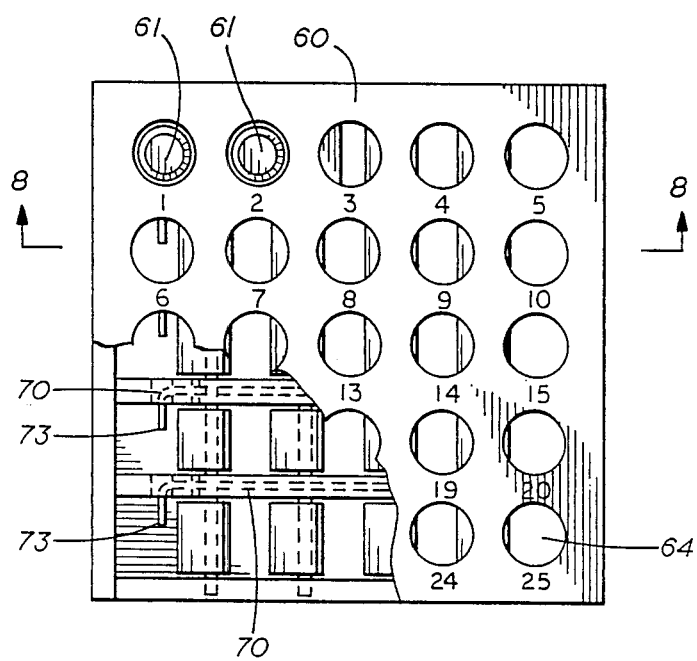
FIG. 7 is a cut away plan view which illustrates the flip side of the top of the Toy of FIG. 6.

The stand may be of any suitable configuration. As illustrated in FIG. 1, the stand is similar in shape to an elongated table, the top member 12, with horizontal upper surface, two vertical support members 13 and an elongated rectangular support member 14. FIG. 6 illustrates an alternative embodiment with an array of top openings rather than the horizontal row of openings of the toy of FIG. 1. This array will later be referred to for the purpose of discussing the selection mechanisms by designating rows and columns according to the usual convention. Individual openings in any array will have specific ($R_n$, $C_m$) designations. The total number of rows will be $R_{max}$ and the total number of columns $C_{max}$. ($R_1$, $C_1$) will refer to the upper left opening. m will increase from left to right for C, and n will increase from top to bottom for R. The horizontal row of ten openings of FIG. 1 is labelled as a number line, each opening being consecutively numbered with an integer from one to ten, from left to right. The toy of FIG. 6 is arranged as a square in plan view object. That is, the top surface 60 is approximately square in plan as illustrated also in FIG. 7. The openings provided in the top surface 60 of the toy of FIGS. 6, 7 are labelled on one side of the removable top with letters of the alphabet, 62 (FIG. 6) and on the reverse of flip side of the removable top with numbers 63 (FIG. 7). The openings in the to of the toy of FIG. 6 and their respective labels are configured as to rows and columns as an array when seen in plan (FIGS. 6, 7). The construction and operation of this toy FIG. 6 will be described in further detail below.

As illustrated in FIG. 1, the two vertical support members 13 are attached to the top member 12, one at each end of the top member. As illustrated by the end view of FIG. 2, the vertical support members 13 are in a shape of a trapezoid, symmetric about its vertical axis, with rounded bottom corners 16. The edge of the upper side of the trapezoidal shaped support member 13 is conterminous with the bottom edge of the end of the top member of the stand 12. The trapezoidal shape provides a broader footprint for stability, and the rounded lower corners, 16 allow smaller children unable to lift the stand to easily slide it, and further may provide some margin of safety whenever the stand has been overturned and the bottom corners of the vertical support members 13 point upward. Depending upon the choice of materials used in constructing the stand, the method of attachment of the vertical support members 13 to the top member 12 may vary, for example, it could be glued, screwed, welded, bolted, nailed, or cemented, or it could be molded in one continuous piece with the top member 12. For ease of assembly and economy, molding components of plastic that will snap together to form the complete toy is the preferred method of construction. A similar arrangement is used for holding the top 60 of the toy of FIG. 6 in correct position. The technique of molding plastic components to snap together would be preferred, but with the additional feature of the removable top, the top 60 of the toy of FIG. 6 must be attached to the sides 65 in a manner that allows release and reversal so the flip side will show. Many possible methods would achieve this, one example being a simple friction fit such as that used by Lego ® blocks. A simple set up of guide pins would also work. It is important for the top to be held in correct position so that the openings 64 will be positioned correctly over the functioning selective obstructing mechanism as will be described in greater detail below.

Looking again at the toy of FIG. 1, the elongated rectangular support member 14 serves a dual purpose in the embodiment illustrated (FIG. 1). The primary purpose is to deflect blocks falling through the shafts toward the front of the toy, but the member serves secondarily as additional structural support. The member is attached at one end to the sinistral vertical support member 13 and at the other end to the dextral vertical support member 13 providing additional structural stability to the stand 10. As illustrated in FIG. 2, the upper surface of the elongated horizontal support member 14 is positioned directly below the vertical shafts 15 disposed in the top member 12. Further, the horizontal support 14 is attached to the vertical supports 13 so that the upper surface of the horizontal support 14 provides an inclined surface 17 sloping down from back to front of the toy (FIG. 2). The purpose of the slight incline 17 provided is that when the toy is used and functions in the manner that will be described below, any blocks 11 dropping unobstructedly through the shafts 15 will strike the inclined upper surface of the horizontal support member 14 and will be deflected toward the front of the toy and therefore toward the child using it. Minimizing a child's frustration with the toy will keep the child playing with it longer and lead to an earlier appreciation of the principles of numerical and alphabetical sequences. Deflecting blocks dropping through the shafts toward the child make for the earlier appreciation of the principles because, a block dropping through the top member and deflected toward the child is easier for the child to pick up and try again. In addition, the sound of a block striking the member 14 provides amusement for the child.

The toy of FIG. 6 utilizes a similar member 66, analogous to that of member 14. The inclined member 66 is attached to the back 67 and the sides 65 of the toy of FIG. 6. The inclined member 66 deflects any blocks 11 dropping unobstructedly through the openings 64 of the toy toward the front of the toy. The function of the inclined member 66 is best appreciated by referring to FIGS. 9 and 10.

The horizontal top member 12 of the stand 10, as illustrated, comprises a horizontal top surface provided with a row of ten square openings into vertical shafts 15 through the top member 12 (FIGS. 1 and 2). The top member 12 is further provided with numerical symbols 24 arranged in the desired sequence from left to right. The sequence of arrangement of the symbols is important because of the way the toy functions, as will be described below. The embodiment illustrated in FIG. 1 is provided with duplicate symbols for numbers from one to ten, one each located on the upper surface of the top member 12, and the other one on the front face of the toy 18. Each number is associated with and juxtaposed one of the ten vertical shafts 15. The numbers are arranged in order with the number one labeling the left most shaft and the number ten labeling the right most shaft, in accordance with the left to right reading convention for the English language. The numbers are in Arabic numerals and may be of contrasting color, inset or raised above the surrounding surface. The numbers are large enough for a child to distinguish easily.

Figure 11:
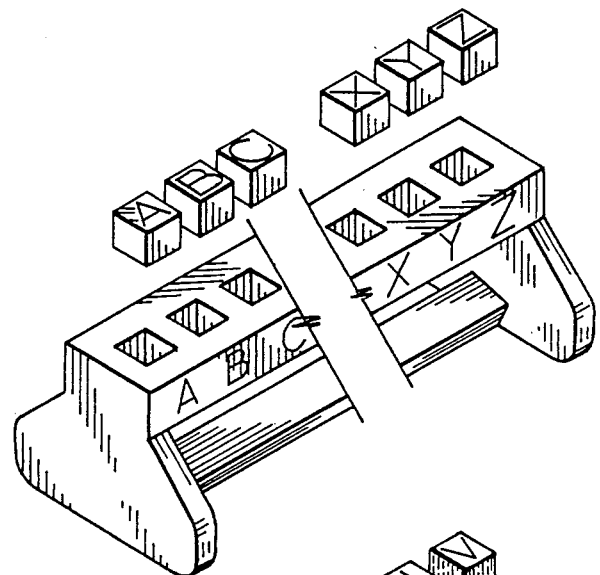
FIG. 11 is a perspective view of an alternative embodiment utilizing alphabetic labels from A to Z.
Figure 13:
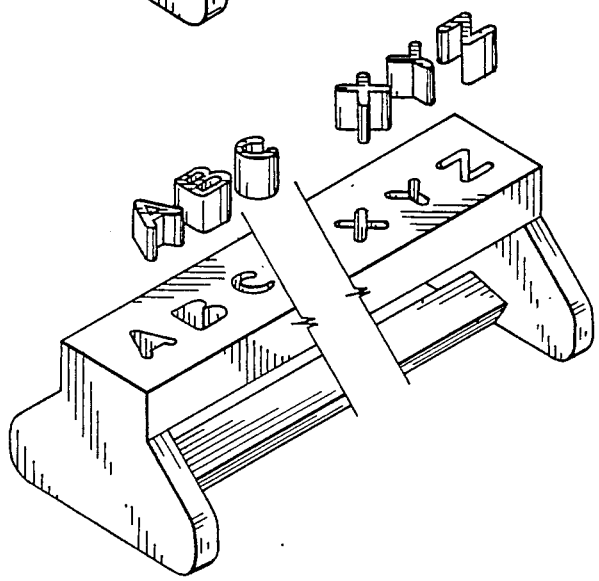
FIG. 13 is a perspective view of an alternative embodiment utilizing 26 shafts configured as the letters of the alphabet and utilizing 26 shafts configured so as to correspond with the blocks.
Figure 14:
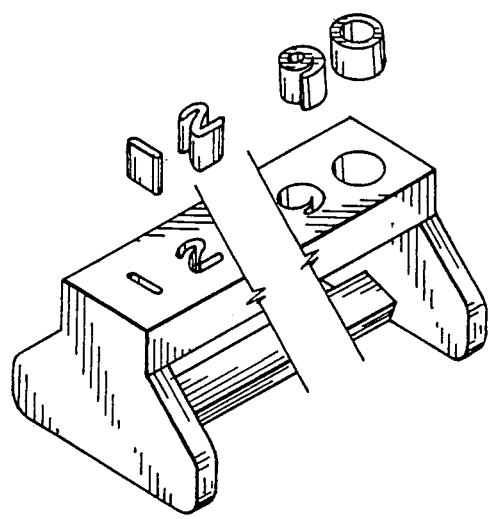
FIG. 14 is an alternative embodiment utilizing 10 openings configured as Arabic Numerals 1 through 10 and utilizing 10 blocks configured so as to correspond to the openings.
Figure 15:
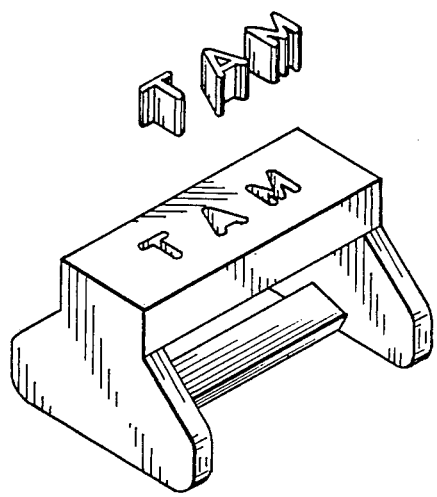
FIG. 15 is a perspective view and alternative embodiment when openings are shaped so as to spell the name "TAM", and which utilizes blocks configured so as to conform to the openings.
Figure 16:
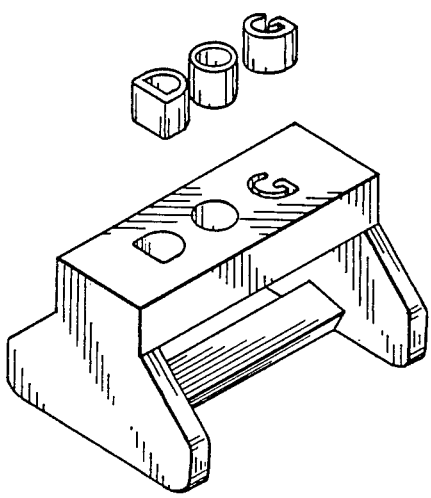
FIG. 16 is a perspective view of an alternative embodiment wherein the openings are shaped so as to accept corresponding blocks shaped as letters which spell a simple word.

Although the toy, as illustrated in FIG. 1, is provided with a row of ten shafts and labeled with numbers from one through ten, it is obvious that varying numbers of shafts, arrangements or arrays, and alternate labels may be used. FIGS. 11–19. The toy could be constructed to assist a child learning to spell its own name by using the proper number of shafts labeled with the correct spelling. For example, four shafts labeled "K", "A", "T", "E", or three shafts labeled "T", "O", "M", or 26 shafts labeled from A to Z. FIGS. 11, 15, 16.

The stand 10 is provided with a protrusion 23 into the left most passage or shaft 15 that prevents any block 11 inerted into that shaft from passing through the top member 12 (FIG. 3). The stand is provided, intermediate to each pair of adjacent shafts, with a thin rectangular slot 19 connecting the pair of shafts (FIGS. 1, 2, and 3). Located within each thin slot 19 is a circular free-swinging cam 20 eccentrically mounted on a fixed pivot pin 21 (FIGS. 2 and 3). In the embodiment illustrated by FIG. 1 the eccentric mounting is achieved by utilizing an annular shape for the circular cams 20. The circular opening provided in each cam 20 is concentric with the cam and is of more than twice the diameter of the pivot pin 21 provided for each cam. The relative diameters of the pivot pins and center circular opening in each cam are selected to provide the needed action for the operation of the selective obstructing of the shafts as will be described below. The concentric circular opening and relatively smaller pivot pin combination is depicted as the preferred embodiment because of the relative ease of manufacture and assembly as compared to the alternative embodiments. Depending upon the material or materials chosen for manufacture, the slot 19 may be drilled, cut, or formed in the initial molding processes, whichever is most feasible. The pivot pin 21 and the circular cam 20 may be formed of the same material as the top member or of a different material. All slots 19 and therefore all cams 20 are in a straight line. Each slot is disposed identically relative to its respective distance from the upper surface of the top member 12 and its respective distance from the front face 18, as all of the other slots. For ease of manufacture and assembly, the top member 12 may be assembled from two independently formed components, one from each side of a vertical plane cut longitudinally through the illustrated embodiment (FIG. 2) passing through the thin slots 19. By using this component method of construction of the top member 12, the slots 19 may be readily formed and the pivot pins 21 and circular cams 20 easily inserted prior to fixing the two components together to form the complete top member 12. When installed in the slots 19, the free swinging cams 20 protrude into both adjacent shafts 15 when no block is inserted in either shaft (FIG. 3).

The blocks 11 may be made of any configuration, as long as the blocks 11 will fit the openings provided in the top surface and pass through the shafts 15 (FIG. 1). Therefore, as in FIG. 1, rectangular blocks 11 are used with rectangular openings, and as in FIG. 6, circular cylindrical blocks 11 are used with circular openings 64. If each shaft is shaped so that its cross section is in the form of a particular symbol, then the block corresponding to that shaft must have a similar cross section. The open shafts could be shaped in the form of the Arabic numerals or in the form of the letters of the alphabet. FIGS. 13-14. In that scenario, each block would have to have a different shape, with one block formed to fit into only one of each of the shafts provided. For simplicity, the embodiment illustrated in FIG. 1 is provided with identical shafts square in cross-section.

Given the identical shafts illustrated in the embodiment of FIG. 1, all the blocks provided with this embodiment would be square in cross-section. The blocks may be made of any suitable material, for example, wood, metal, plastic, or rubber. The length of the block illustrated, messured relative to its longitudinal axis, is twice the thickness of the block measured relative to either minor axis (FIG. 1). These proportions make the block easy for a child to grasp, and make the necessary orientation of the block for insertion into the stand obvious even to young children. In the illustrated embodiment the blocks are provided with eight slots, with two slots being cut into each of the four larger faces of the block (FIG. 1). When viewing a face of a block in elevation, with the longitudinal axis of the block vertical, one slot will be positioned vertically in the second quadrant of the face and the second slot will be positioned in the forth quadrant of the face. The remaining slots 22 are identically positioned in their respective faces.

These slots 22 are provided so that when a block is inserted into the left most shaft, in any of the eight possible ways it may be inserted, one of the slots 22 cut into the faces of the block 11 will be positioned to engage the protrusion 23 of the top member 12 into the left most shaft and the block 11 cannot drop through the stand. The face of the block 11 opposite the protrusion 23 of the left most shaft, pushes the free swinging cam 20 located in the rectangular slot 19, intermediate to the left most shaft and the next adjacent shaft, into the next adjacent shaft. As positioned in the next adjacent shaft and held in place by the block in the left most shaft, this cam 20 will perform the same function as the protrusion 23 provided in the left most shaft, that is, the notch or slot 22 provided on a block inserted into the second shaft will engage the cam 20, held in place by the block in the left most shaft, and therefore the second block inserted will also be prevented from dropping through the stand. The opposite face of the second block will in turn push the next cam located intermediate to the second shaft and the adjacent empty shaft, into the next adjacent shaft so that any block inserted into that shaft will also be prevented from dropping through the stand. In this manner, any block inserted in sequence from left to right will not drop through the stand. However, a block inserted out of sequence will drop through (FIG. 3). The engaging cam 20 to the left will not be held fast by a block if the shaft is vacant, and therefore a block inserted out of sequence will push both free swinging cams 20 protruding into the shaft into the empty adjacent shafts on either side and there will be no obstruction to the block's passage completely through the stand's top member 12 (FIG. 3).

Figure 4:
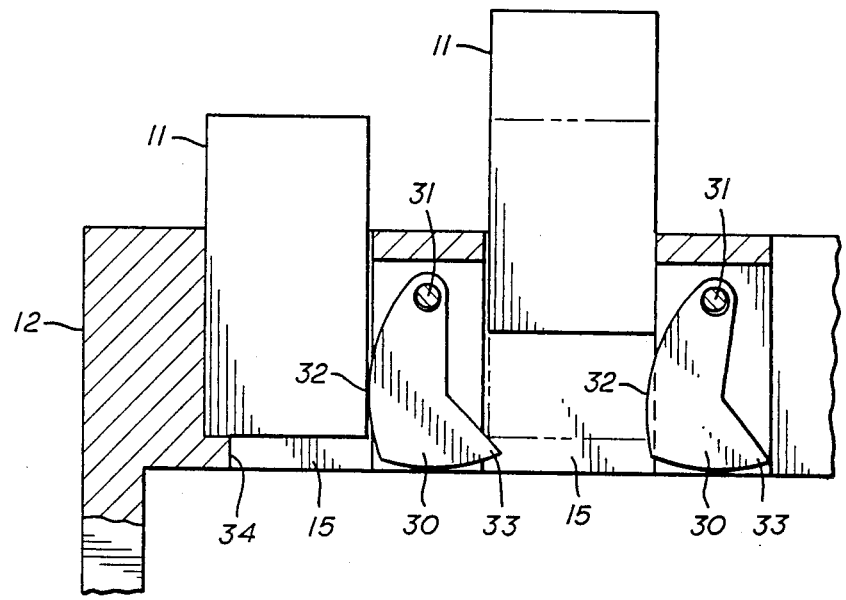
FIG. 4 is an illustration of an alternative embodiment of the selective obstructing means.

Although one preferred embodiment of action means has been described, it is readily apparent that many alternatives are possible. One alternative embodiment would be the invention as described above, but with the substitution of the "L" shaped pendulum 30 for the free swinging cams 20 (FIG. 4). This embodimen is also depicted in the alternative embodiment of the toy shown in FIGS. 6-10. It is apparent that when circular openings 64 and cylindrical blocks 61 are used that it is preferred to use the "L" pendulums 30 which do not require a slot 22 in the block. The pendulums 30 would be suspended from a pivot 31 within the rectangular slot 19 intermediate to adjacent shafts 15. In operation, the pendulum initially, that is with no blocks inserted, would have a heel 32 protruding into the left adjacent shaft but the toe 33 of the pendulum would not protrude into the right adjacent shaft. A block inserted into the left shaft would strike the inclined heel 32 and displace the pendulum to the right moving the toe 33 of the pendulum into the adjacent shaft to the right. This would obstruct the passage of any block inserted into that shaft. An advantage to this embodiment would be the elimination of any need for slotting the blocks, because the pendulum can be configured so that the toe 33, when shifted into the right shaft, comes to rest beneath the block.

Figure 5:
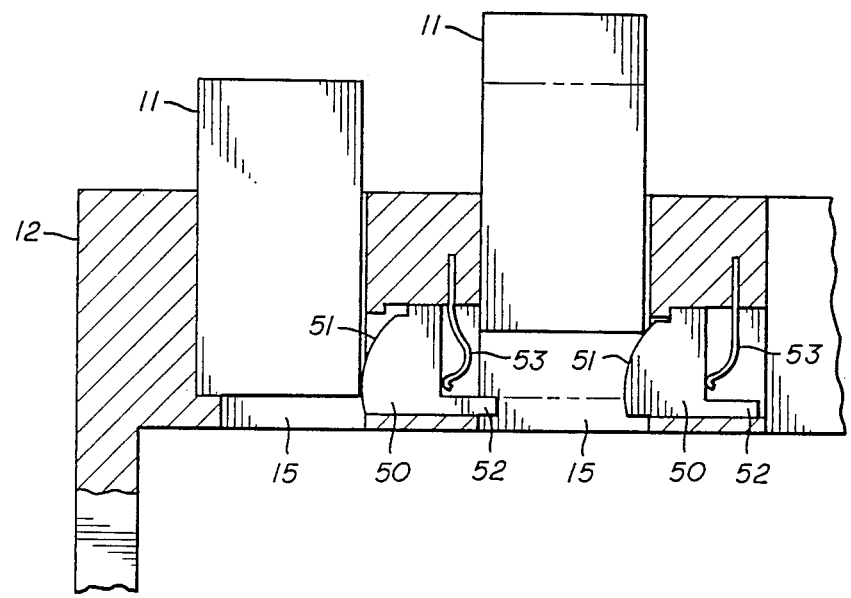
FIG. 5 is an illustration of yet another alternative embodiment of the selective obstructing means.

Another alternative embodiment could be the invention of the first embodiment but with the substitution of a spring loaded sliding piece 50 (FIG. 5). This spring loaded sliding piece 50 located within the rectangular slots 19 intermediate to the vertical shafts 15 is provided with an inclined heel 51, a spring 53, and a horizontal toe 52. The spring 53 is mounted so that the heel of the piece 51 is held protruding into the left adjacent shaft until a block is inserted there. The block inserted into the left adjacent shaft will cause the piece to slide to the right and the toe of the piece 52 will protrude into the right adjacent shaft, obstructing the passage of any block inserted into that shaft. This embodiment also has the advantage of eliminating the need for slotting or notching the blocks, but is somewhat more complicated than the cam and pendulum embodiments.

Reference is now made to FIGS. 6-10 depicting the more complex alternative embodiment. FIG. 6 illustrates a toy which provides a stand which is shaped into an overall box like configuration. The openings 64 provided in the top 60 of the stand are arranged in this embodiment into a 5×5 array of circular openings. As illustrated in FIG. 6, each of the circular openings 61 is labeled with a letter of the alphabet. The arrangement of the letters of the alphabet runs from left to right beginning with the top row and then from left to right for each succeeding row proceeding from the top 68 of the toy (the backside of the top horizontal surface) to the bottom 67 of the toy (the front side of the top horizontal surface). What is provided is thus an array of openings in the horizontal top surface of the toy that is sequentially labeled in the same order as words would ordinarily be arranged for reading on the printed page. The top surface 60 of the toy of this embodiment is removable and, as illustrated in FIG. 7, the flip side of the surface 60 can be provided with a different labeling or color coordinated system for the array of openings. In the example illustrated, one side of the horizontal surface which is provided with the array of holes is labeled with the letters of the alphabet from A to Z as illustrated in FIG. 6 and the flip side of the horizontal surface is labeled with numbers from 1 to 25 illustrated in FIG. 7. The furthest row from the front of the toy, row 1, is labeled from left to right with the numerals from 1 to 5 and then each row closer to the front being labeled 6 to 10, 11 to 15, 16 to 20 and 21 to 25 respectively.

Figure 8:
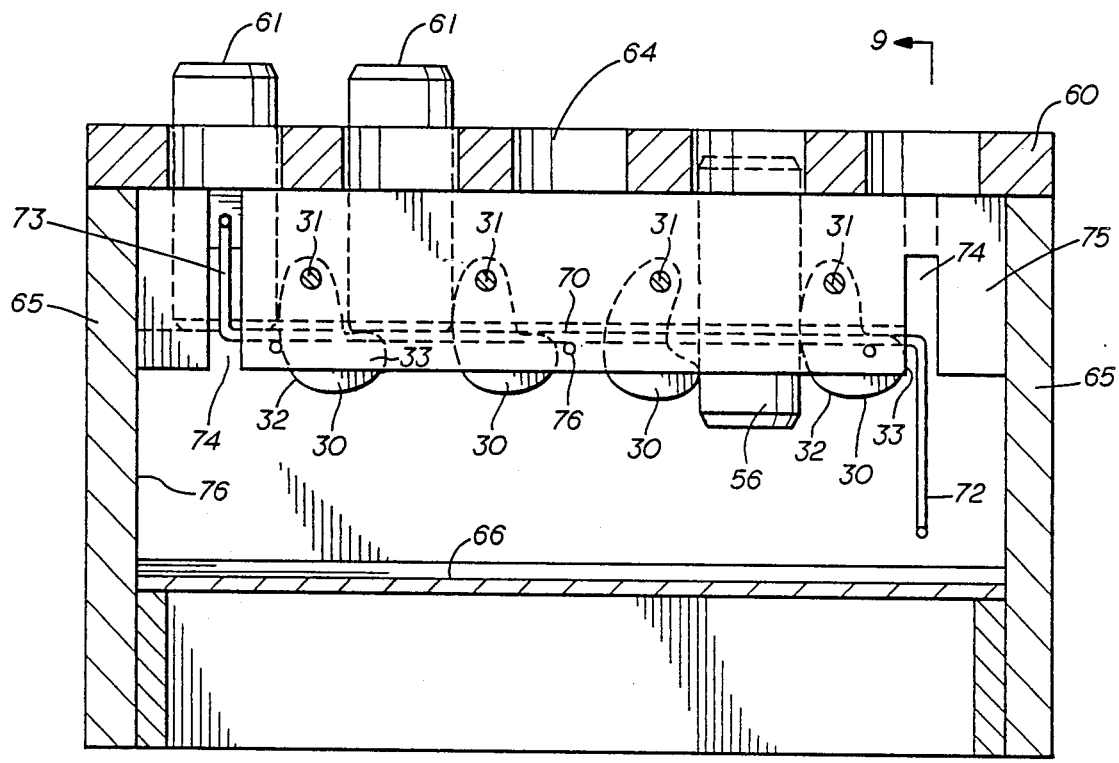
FIG. 8 is a cross-section through the toy of FIG. 7.
Figures 9, 10:
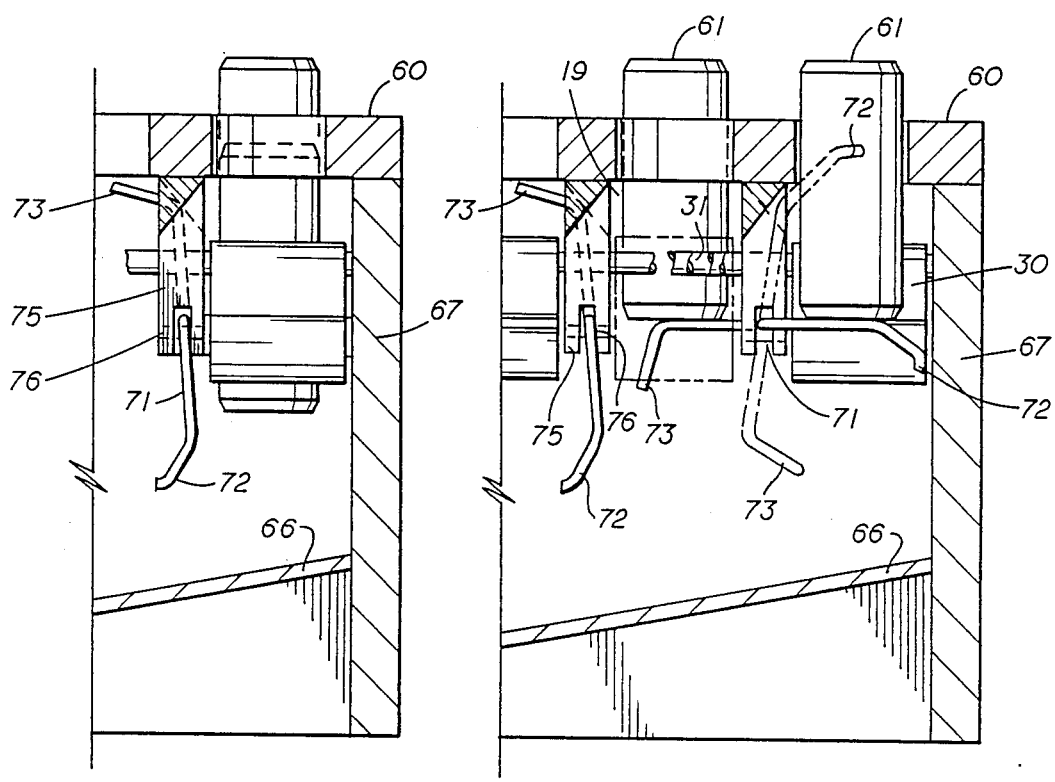
FIG. 9 is a cross-section through FIG. 8.
FIG. 10 is a partial cross section through FIG. 7.

Each row is provided with a means for selectively obstructing or releasing the open shafts such as those previously described and illustrated in FIGS. 3, 4 and 5. In this manner, each row must have blocks inserted in sequence, moving from left to right without skipping any of the openings in order that blocks inserted into the openings will be supported within the openings. In addition to the alternative mechanisms previously described, the array of openings illustrated is further provided with a mechanism for extending the mandatory sequential system from an upper row or row towards the back 68 of the toy to the next adjacent row towards the front 69 of the toy. In the embodiment illustrated this mechanism takes the form of a system of lever rods as illustrated in the cross-sections of FIGS. 8-10. In essence, the mechanism for transferring the requirement for sequential operation from the back rows towards the front rows which requires the sequence to proceed always from left to right for the first row and from left to right for the second and from left to right for the third, etc. comprises a simple rod 70 which is bent into roughly a "Z" shape. The arrangement of "Z" rods utilized in the embodiment of FIG. 6 is best illustrated by the cross-section FIGS. 7-10. FIG. 7 is a cut away which illustrates a plan view of the arrangement of "Z" rods that mandate a sequential operation in the desired fashion. FIG. 7 illustrates that for the 5×5 array four "Z" rods 70 are utilized. For toys with more rows, more rods are needed, always one less rod than the number of rows, each rod mounted between adjacent rows. As illustrated in FIGS. 7-10 each "Z" rod 70 is located within a rod carrying member 75 which is attached at each of its ends to the sides 65 of the toy. The member 75 is provided with a groove or channel 71 which runs lengthwise along with bottom of the 1 member from side to side of the toy. FIGS. 8 and 10. As illustrated in FIGS. 7-10 each "Z" rod is located between two rows of openings 64 within a channel 71. The rods 70 are supported within the grooves by pins 76 in the manner illustrated in FIGS. 8-10. The slight bend or curvature to the arms 72 and 73 makes for smoother operation of the toy. Notches 74 are provided in the member 75 for the operation of the arms 72 and 73 of the "Z" rods. If objects or blocks have been inserted into openings one through four in the correct sequence, the block in opening five will be suspended within the support structure by the previously described eccentric cam or pendulum means or equivalent means. When blocks are inserted into the openings in the desired sequence, a block inserted into opening 5 of FIG. 7 will push down the arm 72 of the "Z" rod 70 which will in turn lift arm 73 of the same "Z" rod and thereby causing it to obstruct passage 6 of FIG. 7. The operation is illustrated in FIGS. 9-10. In a similar manner when the sequences are continued and the objects are inserted in the correct sequence into openings 7, 8, 9 and 10, the block inserted into opening 10 will push down arm 72 of the "Z" rod 70 to opening 10 which will in turn raise the arm 73 of the rod which will then protrude into opening 11 and thereby obstruct opening 11 and prevent the passage of an object through opening 11. In this manner blocks inserted in the correct sequence through openings 15 and 20 will obstruct in turn openings 16 and 21 and mandate that only one sequence of insertion of blocks will correctly provide for finishing with a completed array of blocks positioned and supported within the openings in the toy.

A further feature of the "Z" mechanism is also illustrated in FIGS. 9-10. It should be noted that a cut out or notch 74 is provided so that when blocks are inserted out of proper sequence, as for example, when a block is inserted into an opening labeled 10 out of sequence or when there is not a block in opening 10 the block inserted into opening 11 will simply push down the arm 73 of the "Z" rod 70 and raise the arm 72 of the "Z" rod 70 at the opposite end of the rod into the notch 74 provided. Therefore blocks inserted out of sequence and will fall through the stand. As with the earlier described embodiments, and as previously mentioned, this embodiment of the invention is provided with an inclined element 66 which provides a slanting surface which is analogous to element 14 of FIG. 1. The slanting surface deflects any block that drops through an opening in the top of the stand towards the front of the toy and therefore towards the child as earlier described.

It should be obvious that any of the means previously described for selectively obstructing openings in the top surface of the stand to require insertion of objects in the holes from left to right may be utilized. Additionally, although a single means has been described for transferring the sequence of insertion requirement, from an upper right location to a lower left location has been described, many equivalent means are obvious. By using these means which require sequential insertion of objects into the openings provided in the surface of the stand, many different combinations or arrays of objects within a stand are possible. For example, although the embodiment illustrated in FIGS. 6 through 10 shows a 5×5 array which is labeled on one surface with the numbers from 1 to 25 and on the flip side of that surface with letters of the alphabet, it is not necessary that the array be such a regular 5×5 set up. By utilizing the means whioh require sequential insertion of objects into the stand, the correct numbers and words could be spelled out, such as for example the child's full name or perhaps the child's telephone number, or simple sentences or paragraphs could be constructed. FIGS. 18, 19. An embodiment could be constructed which could teach a child to count from one to ten but which instead of having a single row from left to right of the numbers 1 to 10 could utilize two rows, a 2×5 array, a row from 1 to 5, and a row from 6 to 10. In addition, as with the simpler version with a single row, the openings can be shaped as Arabic numerals or letters of the alphabet, and the blocks provided can be shaped to correspond to and fit into the openings. While the invention has been described by means of a specific example and various specific alternative embodiments, it is not to be limited thereto. Obvious modifications will occur to those skilled in the art without departing from the spirit and scope of the invention.

What is claimed is:

1. A toy comprised of a three dimensional object and a plurality of blocks;
    (a) said three dimensional object including an upper surface provided with open shafts passing through said object;
    (b) one of said shafts provided with obstructing means;
    (c) said blocks proportioned so that when inserted in said unobstructed open shafts they will drop through said object;
    (d) said three dimensional object provided with sequentially obstructing action means for selectively obstructing said open shafts, so that when blocks are inserted in one predetermined sequence they cannot drop through said object.

2. The invention of claim 1 wherein the blocks are formed as three dimensional letters of the alphabet and open shafts are provided wherein each of the shafts is configured in cross section so as to conform to one of the blocks in plan view so that each alphabet block can be fitted into a corresponding shaft.

3. The invention of claim 1 wherein the blocks are formed as three dimensional Arabic numerals from 1 to 10 and open shafts are provided which each of the shafts is configured in cross sections so as to conform to one of the blocks in plan view so that each numeral block can be fitted into a corresponding shaft.

4. The invention of claim 1 wherein letters which spell words are juxtaposed the open shafts so that the insertion of blocks into the open shafts in the predetermined sequence will teach the spelling of the words.

5. The invention of claim 1 wherein letters spelling a child's name are juxtaposed open shafts so that insertion of blocks in the predetermined sequence into each open shaft associated with a letter of the child's name will teach the spelling of the child's name.

6. A toy comprised of a three dimensional object and a plurality of blocks, wherein said three dimensional object includes an upper surface provided with open shafts passing said object, wherein one of said shafts is provided with obstructing means, wherein said blocks are proportioned so that when inserted into said unobstructed open shafts they will drop through said object, and wherein said three dimensional object is provided with means for selectively obstructing said open shafts, so that when blocks are inserted in one predetermined sequence they cannot drop through said object, and wherein:
 (a) said upper surface is horizontal and said shafts are vertical shafts arranged in a row from the sinistral side of said stand to the dextral side of said stand;
 (b) said stand is provided with fixed obstructing means which prohibits any block inserted into the most sinistral shaft from passing through said stand;
 (c) said stand is provided with releasing obstructing action means that prohibits blocks inserted into shafts into one predetermined sequence from passing through said stand, said sequence beginning with the most sinistral shaft and proceeding one shaft at a time to each next adjacent shaft toward the most dextral shaft;
 (d) said releasing obstructing means mounted to said stand selectively obstructing the passage of any block through any given shaft when blocks are inserted in proper sequence beginning with the most sinistral shaft and proceeding in a dextral direction to, and including inserting a block in, the shaft immediately sinistrally adjacent to said given shaft;
 (e) said releasing obstructing action means releasing for all shafts dextral to any given shaft when the block in said given shaft is removed, so that any block inserted into a shaft dextral to said given shaft drops through said stand;
 (f) said releasing obstructing action means not obstructing any shaft dextral to any open shaft so that blocks inserted dextral to any open shaft will drop through said stand.

7. Invention of claim 2 wherein:
 (a) said stand is provided with thin slotted rectangular openings, each of said openings intermediate to an connecting adjacent shafts;
 (b) said releasing obstructing action means is comprised of eccentrically mounted free-swinging circular cams one cam disposed within each of said thin rectangular slotted openings intermediate to the two adjacent shafts so that:
  (i) each cam protrudes into both adjacent shafts when no block is in position in the sinistrally adjacent shaft;
  (ii) when blocks are inserted in the sequence as described in claim 2, each cam swings into the dextrally adjacent shaft thereby obstructing the passage of any block inserted into that shaft; and
  (iii) when a block is inserted into a shaft dextral to any vacant shaft, the cam on the sinistral side of said dextral shaft swings sinistrally into the adjacent vacant shaft and the cam on the dextral side of said dextral shaft swings dextrally into the dextrally adjacent shaft and the block drops unobstructively through the stand;
 (c) said blocks are provided with slotted sockets disposed to engage the cam on the sinistral side of any given shaft when blocks have been inserted in proper sequence into all shafts sinistral to said shaft;
 (d) said stand is provided with a longitudinal member disposed directly below said shafts and the upper surface of said member provides a slight incline to the horizontal so that any block inserted into any shaft out of sequence and dropping through the stand will strike the inclined upper surface of the longitudinal member, and slide forward of the stand and toward the user.

8. The invention of claim 6 provided with ten consecutively numbered shafts, wherein the most sinistral shaft is labeled with the Arabic numeral 1 and the most dextral shaft is labeled with the Arabic numeral 10.

9. The invention of claim 6 provided with twenty-six alphabetically labeled shafts wherein the most sinistral shaft is labeled with the letter A and the most dextral shaft is labeled with the letter Z.

10. The invention of claim 6 wherein the stand is colored with shadings of the spectrum from the sinistral side of the stand to the dextral side and each block is colored with a different color of the spectrum corresponding to the particular shade of color located on the stand at one of the open shafts.

11. A toy comprising a plurality of three dimensional objects in a support structure with openings embodying a sequential system for assembly of an array of the three dimensional objects within openings in the support structure within:
 (a) said structure is provided with fixed obstructing means which prohibits any object inserted into the most sinistral opening from passing through said structure;
 (b) said structure is provided with releasing obstructing action means that prohibits objects inserted into openings in one predetermined sequence from passing through said structure, and supports said objects within said support structure, said sequence beginning with the most sinistral opening and proceeding one opening at a time to each next adjacent opening toward the most dextral opening;
 (c) said releasing obstructing means mounted to said structure selectively obstructing the passage of any object through any given opening when objects are inserted in proper sequence beginning with the most sinistral opening and proceeding in a dextral direction to, and including inserting an object in, the opening immediately sinistrally adjacent to said given opening;

(d) said releasing obstructing action means not obstructing any opening dextral to any opening without an object, so that objects inserted dextral to any opening which does not contain an object, will drop through said stand.

12. A toy comprising a plurality of three dimensional objects and a support structure with openings embodying a sequential system for assembly of an array of the three dimensional objects within openings in the support structure wherein:
(a) the support structure is provided with a single row of openings through its upper surface;
(b) said structure is provided with fixed obstructing means which prohibits any object inserted into the most sinistral opening from passing through said structure;
(c) said structure is provided with releasing obstructing action means that prohibits objects inserted into openings in one predetermined sequence from passing through said structure, and supports said objects within said support structure, said sequence beginning with the most sinistral opening and proceeding one opening at a time to each next adjacent opening toward the most dextral opening;
(d) said releasing obstructing means mounted to said structure selectively obstructing the passage of any object through any given opening when objects are inserted in proper sequence beginning with the most sinistral opening and proceeding in a dextral direction to, and including inserting an object in, the opening immediately sinistrally adjacent to said given opening;
(e) said releasing obstructing action mens not obstructing any opening dextral to any opening without an object, so that objects inserted dextral to any opening which does not contain an object, will crop through said stand.

13. The invention of claim 12 wherein:
(a) said support structure is provided with an upper surface with left and right sides;
(b) said upper surface is provided with openings;
(c) said support structure is provided with slots below the upper surface, each slot intermediate to and open to adjacent openings in a row through the support structure;
(d) said sequential system for assembly comprises
  (i) rounded "L" shaped pendulums eccentrically suspended from a pivot disposed within each of said slots intermediate to the openings through said support structure so that
    (A) when no objects are present within any of the openings each "L" pendulum hangs from the pivot pin through the top of the "L" with the heel portion of the "L" protruding into the opening to the left of the pendulum and with the toe portion of the "L" positioned within the slot to the immediate left of the opening to the right of the pendulum;
    (B) when an object is placed within an opening to the left of a pendulum the pendulum is displaced to the right and the toe of said pendulum protrudes into the opening to the right of said pendulum obstructing said rightward opening and preventing the passage of any of the objects through said rightward opening through said support structure so long as said pendulum is so displaced;
  (ii) a protrusion into the first opening from the left which obstructs said opening and supports within said opening any of said objects placed within said opening, said objects in turn displacing the heel of the pendulum protruding into said left opening and thereby obstructing the next opening to the right.

14. The invention of claim 12 with additional rows of openings through the support structure so that the openings form an even $R \times C$ array, with $R_{max}$ being the number of rows numbered from top to bottom, and $C_{max}$ being the number of openings in each row numbered from left to right, wherein, means is provided for transferring the requirement for sequential assembly of objects into an array within the support structure from each openings $(R_n, C_{max})$ to opening $(R_{n+1}, C_1)$, that is from the extreme right of an upper row to the extreme left of the next row lower.

15. The invention of claim 14 wherein:
(a) said support structure is provided with an upper surface with left and right sides;
(b) said upper surface is provided with openings;
(c) said support structure is provided with slots below the upper surface, each slot intermediate to and open to adjacent openings in a row through the support structure;
(d) said system requiring sequential assembly comprises
  (i) a protrusion into the first opening from the left which obstructs said opening and supports within said opening any of said objects placed within said opening, said objects in turn displacing the heel of the pendulum protruding into said left opening and thereby obstructing the next opening to the right.
  (ii) rounded "L" shaped pendulums suspended from a pivot disposed within each of said slots intermediate to the openings through said support structure so that
    (A) when no objects are present within any of the openings each "L" pendulum hangs from the pivot pin through the top of the "L" with the heel portion of the "L" protruding into the opening to the left of the pendulum and with the toe portion of the "L" positioned within the slot to the immediate left of the opening to the right of the pendulum;
    (B) when an object is placed within an opening to the left of a pendulum the pendulum is displaced to the right and the toe of said pendulum protrudes into the opening to the right of said pendulum obstructing said rightward opening and preventing the passage of any of the objects through said rightward opening through said support structure so long as said pendulum is so displaced.
  (iii) means for transferring the sequential assembly requirement from an upper row to the next row lower comprising:
    (A) longitudinal support members located below the upper surface, and affixed at one end to the left side and at the opposite end to the right side of said support structure;

(B) a groove disposed lengthwise; facing downward along the underside of each of said support members;

(C) a rod comprising a medial segment disposed within said lengthwise groove, a first distal segment bent 90° relative to said medial segment to protrude into an opening ($R_n$, $C_{max}$) so that when an object is inserted into the opening the object strikes the end of the rod and depresses it, causing the medial segment to rotate about its longitudinal axis, a second distal segment at the opposite end of said rod, said second distal segment bent 90° relative to said medial segment to protrude into an opening ($R_{n+1}$, $C_{min}$) only when said first digital segment is depressed by an object inserted into its opening ($R_n$, $C_{min}$).

16. The invention of claim 15 provided with ten consecutively numbered openings in a 5×2 array, two rows by five columns.

17. The invention of claim 15 provided with twenty-five alphabetically consecutively labeled openings, in a 5×5 array.

18. The invention of claim 15 wherein the blocks have cross sections shaped like the Arabic numerals from 1 to 10 and corresponding shafts are provided for each block.

19. The invention of claim 15 wherein the openings are labeled with the letters spelling simple words.

20. The invention of claim 15 wherein the openings are labeled with the letters spelling a child's name.

* * * * *